(12) United States Patent
McClintock et al.

(10) Patent No.: US 9,576,147 B1
(45) Date of Patent: Feb. 21, 2017

(54) SECURITY POLICY APPLICATION THROUGH DATA TAGGING

(71) Applicant: AMAZON TECHNOLOGIES, INC., Seattle, WA (US)

(72) Inventors: Jon Arron McClintock, Seattle, WA (US); John Elias Darrow, Shoreline, WA (US); Patrick Nicholas Denton, Seattle, WA (US); Assim Deodia, Hyderabad (IN); Ketan Ramesh Deshpande, San Jose, CA (US); Kadirvel Chockalingam Vanniarajan, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/589,824

(22) Filed: Jan. 5, 2015

(51) Int. Cl.
*G06F 21/62* (2013.01)
*G06F 21/64* (2013.01)
*H04L 29/06* (2006.01)
*G06F 21/10* (2013.01)

(52) U.S. Cl.
CPC ........... *G06F 21/6218* (2013.01); *G06F 21/10* (2013.01); *G06F 21/6227* (2013.01); *G06F 21/64* (2013.01); *H04L 63/1433* (2013.01)

(58) Field of Classification Search
CPC ...... G06F 21/6218; G06F 21/64; G06F 21/10; G06F 21/6227; H04L 63/1433
See application file for complete search history.

(56) References Cited

U.S. PATENT DOCUMENTS

| | | | | |
|---|---|---|---|---|
| 8,127,360 | B1* | 2/2012 | Wilhelm | G06F 21/552 726/25 |
| 8,260,711 | B1* | 9/2012 | Wawda | G06F 21/10 705/57 |
| 9,246,944 | B1* | 1/2016 | Chen | H04L 63/20 |
| 2006/0120526 | A1* | 6/2006 | Boucher | G06F 21/6218 380/247 |
| 2008/0189250 | A1* | 8/2008 | Cha | G06F 21/10 |
| 2009/0201978 | A1* | 8/2009 | Tonsing | H04L 63/0464 375/224 |
| 2010/0180349 | A1* | 7/2010 | Koohgoli | G06F 21/10 726/30 |

(Continued)

OTHER PUBLICATIONS

Demsky, Brian. "Cross-application data provenance and policy enforcement." ACM Transactions on Information and System Security (TISSEC) 14.1 (2011): 6.*

(Continued)

*Primary Examiner* — Kari Schmidt
(74) *Attorney, Agent, or Firm* — Lindauer Law, PLLC

(57) ABSTRACT

Techniques are described for applying data usage policies through data tagging. A metadata tag may be applied to data to indicate a type of the data. In some cases, the tag may be applied to the data when the data is decrypted, and the tag may propagate with the data as the data is passed between processes. A software module may include control logic that is configured to apply data usage policies based on the type tag of data. When the software module attempts an action on the data, such as storing or communicating the data, the control logic may access policy information. Based on the policy information, the control logic may allow the action, prevent the action, or allow the action to proceed on a modified version of the data.

20 Claims, 9 Drawing Sheets

(56) References Cited

U.S. PATENT DOCUMENTS

2011/0145918 A1* 6/2011 Jung ................ G06F 21/52
726/22
2012/0239987 A1* 9/2012 Chow ............... G06F 9/45533
714/49
2012/0290850 A1* 11/2012 Brandt .............. G06F 21/575
713/189

OTHER PUBLICATIONS

Fleming, Charles, et al. "Data Tethers: Preventing information leakage by enforcing environmental data access policies." 2012 IEEE International Conference on Communications (ICC). IEEE, 2012, pp. 835-840.*

"Perl 5 Version 20.1 Documentation", by Perl 5 Porters, [retrieved Dec. 2, 2014] Retrieved from the Internet: <http://perldoc.perl.org/perlsec.html>.

Ragle, Dan, "Introduction to Perl's Taint Mode", Created: Apr. 18, 2006, Revised: May 5, 2006 [retrieved Dec. 2, 2014] Retrieved from the Internet: <http://www.webreference.com/programming/perl/taint/index.html>.

* cited by examiner

SECURITY POLICY APPLICATION THROUGH DATA TAGGING

BACKGROUND

A business, government entity, or other organization may process and store large amounts of data associated with users, customers, products, services, vendors, finances, or operations generally. In some cases, the stored data may include sensitive data describing financial accounts, personal identification information, private health information, access credentials, and so forth. An organization may implement processes and standards to ensure that such sensitive data remains confidential and not accessible to unauthorized personnel inside or outside the organization.

Figure 1:
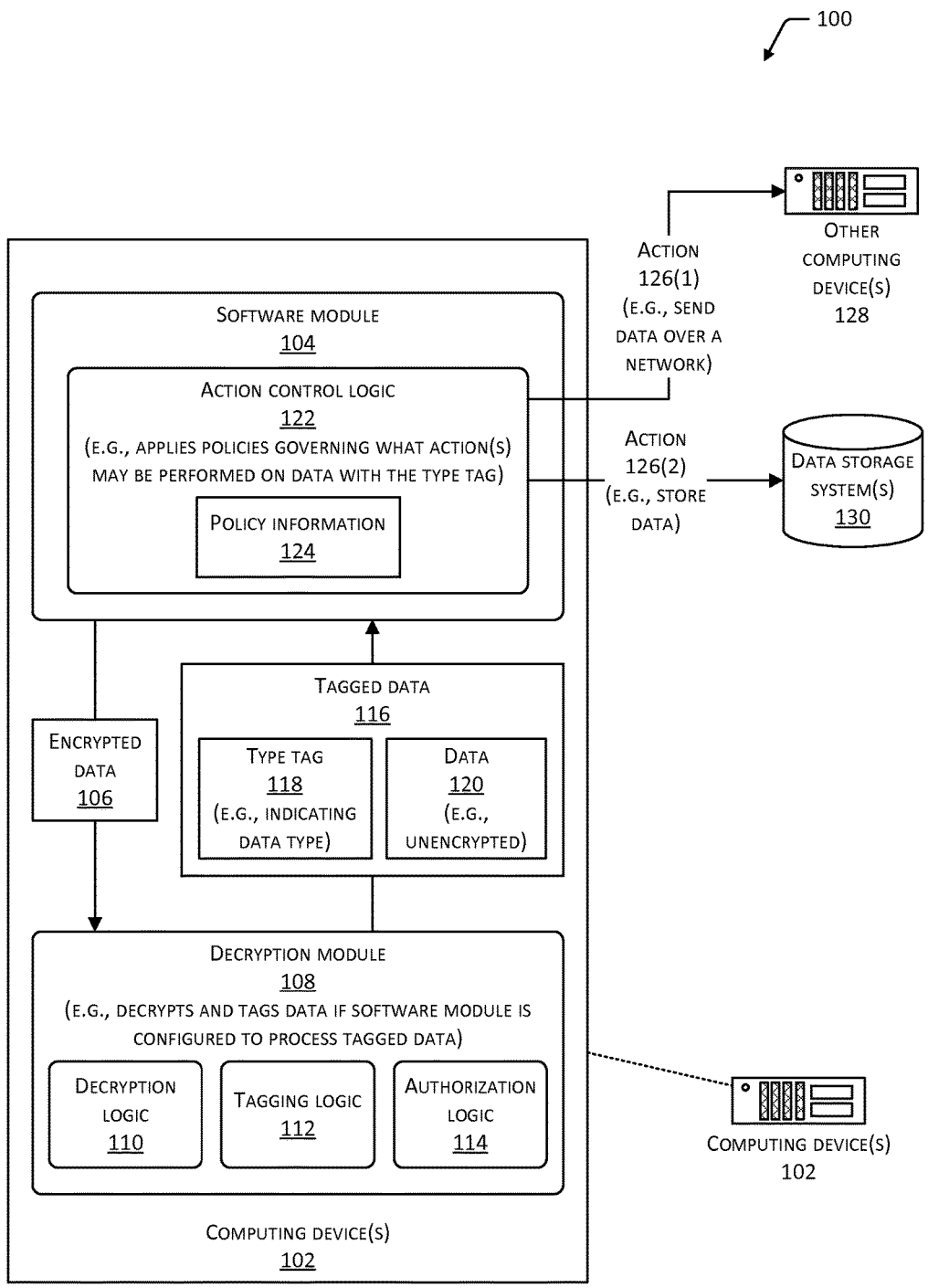
FIG. 1 depicts an environment for using tagged data to apply policies governing data usage, in which the data is tagged through operations performed by a decryption module.

Certain implementations and embodiments will now be described more fully below with reference to the accompanying figures in which various aspects are shown. Aspects may be implemented in many different forms and should not be construed as limited to the implementations set forth herein. Like numbers refer to like elements throughout this disclosure.

DETAILED DESCRIPTION

This disclosure describes implementations of systems, devices, methods, and computer-readable media for applying a tag corresponding to a data type of data and employing the tag to enforce data usage policies in a computing environment. A type tag may codify or otherwise indicate a type or classification of a portion of data. For example, if data includes an email address, the type tag may indicate that the data includes an email address. In some implementations, the data and the type tag may comprise a data structure that may be passed between software modules through function calls and returns, or via network communications. Alternatively, the type tag may be incorporated into a portion of the data (e.g., at the beginning of the data) during a tagging process. The tagged data may be written to data storage system(s), file(s), and so forth. In some cases, the tagged data may be copied or passed between software modules and computing systems such that the type tag propagates with the data as it is copied or passed. In some implementations, data may be tagged when it is decrypted. Accordingly, data passed between software modules or computing systems may be encrypted or tagged. The data tagging may be performed by a decryption module that executes separately from the software module processing the data. Alternatively, the data tagging and decryption may be performed by executable instructions that are included in, or otherwise propagate with, the encrypted data.

In some implementations, a software module may include executable code that is configured to apply data usage policies based on the type tag of the data. For example, a policy may indicate that data tagged as an email address may be passed to an application programming interface (API) that writes the data to a file on disk, but the policy may also indicate that such data may not be passed to an API that sends the data over a network. As another example, a policy may indicate that data tagged as a credit card number or other payment instrument information may be written to a file or stored in a data storage system after the data has been redacted or obfuscated to prevent unauthorized use.

In some cases, the tagged data may include sensitive data such as user identification information (e.g., names, addresses, and so forth), payment instrument information (e.g., credit card numbers, bank account information, routing information, and so forth), financial data, health data, security credentials (e.g., usernames, passwords, certificates, and so forth), or other types of data. An organization may enforce data handling policies that govern how sensitive data may be communicated, stored, written, or otherwise processed. Implementations employ data tagging to codify data handling policies within an organization, and to ensure that the policies are consistently, uniformly, and automatically applied by the various software modules that handle the data.

FIG. 1 depicts an environment 100 in which implementations may operate. As shown in FIG. 1, the environment 100 may include one or more computing devices 102. The computing device(s) 102 may comprise any type of computing device, including but not limited to a network computer, a server computer, a mainframe computer, a distributed computing device (e.g., a cloud server), a personal computer, a smartphone, a tablet computer, a wearable computer, an implanted computer, a mobile gaming device, an electronic book (e-book) reader, an automotive computer, a desktop computer, a laptop computer, a game console, a home entertainment device, and so forth. Although examples herein may describe the computing device(s) 102 as physical device(s), implementations are not so limited. In some cases, the computing device(s) 102 may include one or more of a virtual computing environment, a hypervisor, an emulation, or a virtual machine executing on one or more physical computing devices. In some cases, two or more of the computing devices 102 may comprise a cluster, cloud, farm, or other grouping of multiple devices that coordinate operations to provide load balancing, failover support, parallel processing capabilities, shared storage resources, or other aspects. The computing device(s) 102 are described further with reference to FIGS. 5 and 6.

The computing device(s) 102 may include a software module 104. In some cases, the software module 104 may include one or more executable modules such as an application, executable library, API, other type of executable interface, class, object, program, and so forth. The software module 104 may execute in the active, runtime (e.g., physical) memory of the computing device(s) 102. The software module 104 may provide any type of functionality, and may include or not include user interface (UI) elements.

In some cases, the source code of the software module 104 may be written in a programming language that compiles to machine-executable binary code, such as C, C++, Objective-C™, and so forth. In such cases, the source code may be compiled, linked, or otherwise built to generate the software module 104 as including any number of machine-executable instructions that execute on the processor(s) and within the operating system (OS) of the computing device(s) 102. In some cases, the source code of the software module 104 may be written in a programming language that compiles to an intermediate language (e.g., byte-codes), such as Java™, C#™, and so forth. In such cases, the source code may be compiled, linked, or otherwise built to generate the software module 104 as including any number of executable instructions (e.g., byte-code instructions) that execute within a runtime application such as a Java™ Virtual Machine (JVM), C#™ runtime, or any other runtime, interpreter, virtual machine, or execution engine. In some cases, the software module 104 may include any number of executable instructions in a scripting language or interpreted language, such as JavaScript™, ActiveScript™, VBScript™, Perl™, and so forth. In such cases, the software module 104 may execute within a runtime application such as a runtime, an interpreter, a virtual machine, a scripting engine, and so forth.

In some cases, the software module 104 may be a web application configured to execute, at least partly, in a web browser or other container for the presentation of web content, such as a WebView or UIWebView class. Accordingly, the software module 104 may include dynamic scripting or programmatic elements described using any programming language, such as JavaScript™, ActiveScript™, VBScript™, Perl™, and so forth. Implementations support the use of any web browser to execute the software module 104, including but not limited to one or more of the following: Mozilla Firefox™; Microsoft Internet Explorer™; Google Chrome™; Apple Safari™; Rockmelt™; and so forth. Implementations also support the use of a web browser, such as the Amazon Silk™ browser, in which the processing of content is performed partly on the computing device(s) 102 and partly on other device(s). In cases where the software module 104 is to be presented, at least partly, within a web browser or other container for the presentation of web content, the software module 104 may include any number of web pages that are described at least in part using a markup language such as any version of Hypertext Markup Language (HTML), Dynamic HTML (DHTML), Extensible HTML (XHTML), Extensible Markup Language (XML), and so forth.

The software module 104 may access encrypted data 106. In some cases, the software module 104 may receive the encrypted data 106 from another software module (not shown) executing on the computing device(s) 102 or on other device(s). Implementations support the handling of encrypted data 106 that is encrypted using any method. Implementations support the use of public-key (e.g., asymmetric) cryptosystems, such as any version of: the Rivest Shamir Adleman (RSA) cryptosystem; the Integrated Encryption Scheme (IES); the Digital Signature Standard (DSS); the Cramer-Shoup cryptosystem; or others. Implementations also support the use of symmetric cryptosystems, such as any version of: the Advanced Encryption Standard (AES); the Data Encryption Standard (DES); or others.

The software module 104 may be configured to process data in an unencrypted state. Accordingly, the software module 104 may provide the encrypted data 106 to a decryption module 108 that is configured to decrypt the encrypted data 106. In some implementations, the decryption module 108 may execute on a different set of one or more computing devices 102 than the software module 104. In such cases, the encrypted data 106 may be sent over a network (not shown) to the decryption module 108. Alternatively, as shown in FIG. 1, the decryption module 108 may execute on a same set of computing device(s) 102 as the software module 104. In some implementations, the decryption module 108 may execute on the same computing device(s) 102 as the software module 104 to avoid the additional latency that may be introduced through network calls to decrypt the encrypted data 106.

The decryption module 108 may be configured to include one or more of decryption logic 110, tagging logic 112, or authorization logic 114. In some cases, one or more of the decryption logic 110, tagging logic 112, or authorization logic 114 may be included in the executable code of the decryption module 108. Alternatively, one or more of the decryption logic 110, tagging logic 112, or authorization logic 114 may be included in modules that are called from, and that execute separately from, the decryption module 108, such as libraries, APIs, and so forth. For example, the decryption module 108 may call out to another device that executes the authorization logic 114 as part of a service, and the service may indicate to the decryption module 108 whether the computing device(s) 102 or the software module 104 is authorized to access unencrypted data 120. The service may also indicate whether the software module 104 is configured to handle the tagged data 116.

In some implementations, the determination whether the software module 104 is authorized to handle the data 120 may be based, at least partly, on the particular action 126 that the software module 104 is to perform on the data 120. In such cases, the software module 104 may indicate, to the authorization logic 114 or the decryption module 108, the action(s) 126 to be performed on the data 120. The authorization logic 114 may then determine whether the software module 104 is authorized to perform the action(s) 126. Accordingly, in some implementations at least a portion of the action control logic 122 may be incorporated into the authorization logic 114 or the decryption module 108 to apply policy-based authorization decisions based on one or more of the following: the identity of the software module 104, the identity of the computing device(s) 102, the type tag 118 of the data 120, or the action(s) 126 to be performed on the data 120. In such cases, the software module 104 may be configured to send an authorization request to the decryption module 108 or the authorization logic 114 before attempting an action 126, and the result(s) of the attempted action 126 may be based on a response to the authorization request sent from the decryption module 108 or the authorization logic 114.

The decryption module 108 may generate tagged data 116 that is provided to the software module 104. The tagged data 116 may include a type tag 118 and the unencrypted data 120. The type tag 118 may identify a data type of the unencrypted data 120.

The decryption logic 110 may perform operations to decrypt the encrypted data 106 and generate the unencrypted (e.g., plaintext) data 120. In some implementations, the decryption logic 110 may call a key broker service to request decryption key(s) to be employed in decrypting the encrypted data 106. The key broker service may execute on the computing device(s) 102 or on other device(s), and may provide cryptographic key(s) or other information to authorized calling processes. In some implementations, the decryption logic 110 may employ a trusted platform module (TPM) to perform decryption operations. The TPM may comprise a hardware-based key store or cryptographic module that is incorporated into the computing device(s) 102. A TPM may provide a secure environment for performing cryptographic operations.

The tagging logic 112 may perform operations to determine a type tag 118 corresponding to a data type of the unencrypted data 120. For example, the type tag 118 may indicate that the data 120 includes a user name, user identifier (e.g., identification number), user description, user address (e.g., home, address, email address, etc.), access credential (e.g., login, password, etc.), other user information, payment instrument information (e.g., a credit card number, bank account number, and so forth), or some other type of data. The type tag 118 may comprise metadata that describes the data 120. Implementations support the use of a type tag 118 that is of any size and in any format. In some cases, the type tag 118 may comprise a code (e.g., numeric code) that corresponds to a data type. Alternatively, the type tag 118 may comprise descriptive text. The type tag 118 is described further with reference to FIG. 3. An example process for determining the type tag 118 for an instance of data 120 is described further with reference to FIG. 9.

The authorization logic 114 may perform operations to determine whether the software module 104 is authorized to access the unencrypted data 120. The authorization logic 114 may determine whether the software module 104 is authorized based on a name, version number, or other information that identifies the software module 104. In some cases, the determination may be based on information regarding the computing device(s) 102 where the software module 104 is executing, such as the hardware configuration, software configuration, OS, network access, domain membership, physical location, or other information. The determination may also be based on the presence of the name, or other identifier, of the software module 104 on a white list of authorized software module(s) 104. In some cases, the determination may be based on the absence of the name, or other identifier, of the software module 104 on a black list of unauthorized software module(s) 104.

In some cases, one or more network administrators, domain administrators, developers, testers, managers, or other individuals may designate a software module 104 as authorized or unauthorized based on its configuration, based on the computing device(s) 102 on which the software module 104 executes, or based on other considerations. In some cases, the designation of a software module 104 as authorized may be based on the software module 104 executing on computing device(s) 102 that are part of a domain or connected over a network that is accessible to authorized processes or individuals. In some cases, an authorized software module 104 may execute in an environment that is secured against outside access by a network firewall or via other means.

The authorization logic 114 may also determine whether the software module 104 is configured to interpret the type tag 118 and otherwise process tagged data 116. In some cases, the determination that the software module 104 is configured to handle tagged data 116 may be based on the software module 104 including, or having access to, action control logic 122. The action control logic 122 may include, or have access to, policy information 124 describing one or more policies governing action(s) 126 that may be performed on the data 120 associated with the type tag 118. In some implementations, the policy information 124 may be stored on the computing device(s) 102 and accessed by the action control logic 122. The policy information 124 may also be incorporated into (e.g., written into) the action control logic 122. In some cases, the action control logic 122 may perform a network call to a service executing on another device, the network call requesting at least a portion of the policy information 124.

In some implementations, the decryption module 108 may provide the tagged data 116 to the software module 104 if the authorization logic 114 determines that the software module 104 is authorized to access the unencrypted data 120 and configured for handling the tagged data 116. If the authorization logic 114 determines that the software module 104 is unauthorized, or is not configured to handle tagged data 116, the decryption module 108 may send an error message to the software module 104 indicating that the requested decryption operation has failed. An example process for decrypting and tagging the data 120 is described with reference to FIG. 7.

In some cases, the data 120 may include sensitive data. Sensitive data may refer to any information that is confidential, critical, personal, or private with respect to one or more users. For example, sensitive data may include financial information or payment instrument information for customers or other users, such as bank account numbers, routing numbers, credit card numbers, other account information, financial history, and so forth. Sensitive data may also include personal identification information for customers or other users, such as names, identification numbers (e.g., social security numbers or other government-issued identifiers), addresses, email addresses, social network IDs, other account IDs, telephone numbers, and the like. Sensitive data may also include health care information, health status information, medical history, or other health-related information associated with customers or other users. In some cases, sensitive data may include security credentials such as login names, user names, passwords, tokens, certificates, and so forth.

In some cases, the data 120 may include user behavior data, such as order history, purchase history, browsing history, or clickstream data (e.g., describing actions taken by a user on a web site or other application). The data 120 may also include any type of information provided by a user, such as voice input data or other audio data, images, videos, documents, handwriting samples, medical information, and so forth.

An organization, such as a business, may enforce data usage policies to ensure that sensitive data is not accessible to individuals outside the organization. In some cases, data usage policies may ensure that access to sensitive data is limited to authorized personnel, processes, or devices within an organization. The data usage policies may be described in the policy information 124. In some implementations, the policy information 124 may be incorporated into (e.g., coded into) the action control logic 122, or the action control logic 122 may access a file or other data structure that includes the policy information 124. Alternatively, the action control logic 122 may call an API or a service that executes on the computing device(s) 102 or elsewhere to provide the policy information 124 in response to a request. In some cases, updated policy information 124 may be sent from a server device to update the data usage policies within an organization. The policy information 124 is described further with reference to FIG. 4.

The software module 104 may be configured to perform one or more actions 126 on the data 120. For one or more actions 126 to be performed on the data 120 by the software module 104, the action control logic 122 may determine, based on the policy information 124, whether to allow, disallow, or modify the action(s) 126. For example, the software module 104 may be written to include an instruction that communicates data 120 over a network, or that calls an API to perform such communication. The type tag 118 may indicate that the data 120 includes a credit card number. Based on the policy information 124 indicating that a credit card number may not be communicated over a network, the action control logic 122 may prevent the action 126 from being performed by the software module 104. In some cases, the action control logic 122 may be incorporated into the software module 104 as a library, software development kit (SDK), or other set of executable instructions. Alternatively, the action control logic 122 may be included in a module that executes separately from the software module 104 and that is callable from the software module 104. The process for applying the policy information 124 to control the action(s) 126 performed on the data 120 is described further with reference to FIG. 8.

The action control logic 122 may be configured to trap, intercept, or otherwise detect action(s) 126 attempted by the software module 104. The action control logic 122 may then determine whether to allow, prevent, or modify the action(s) 126 based on the policy information 124. The action(s) 126 controlled by the action control logic 122 may include, but are not limited to, one or more of the following:

Sending the data 120 over one or more networks to other computing device(s) 128, or to other software module(s) executing on the other computing device(s) 128;

Storing the data 120 in data storage system(s) 130 that are external to or incorporated into the computing device(s) 102; or Writing the data 120 to a log file or other file(s), storing the data 120 in a register, or otherwise placing the data 120 in persistent or active memory on the computing device(s) 102.

Figure 4:
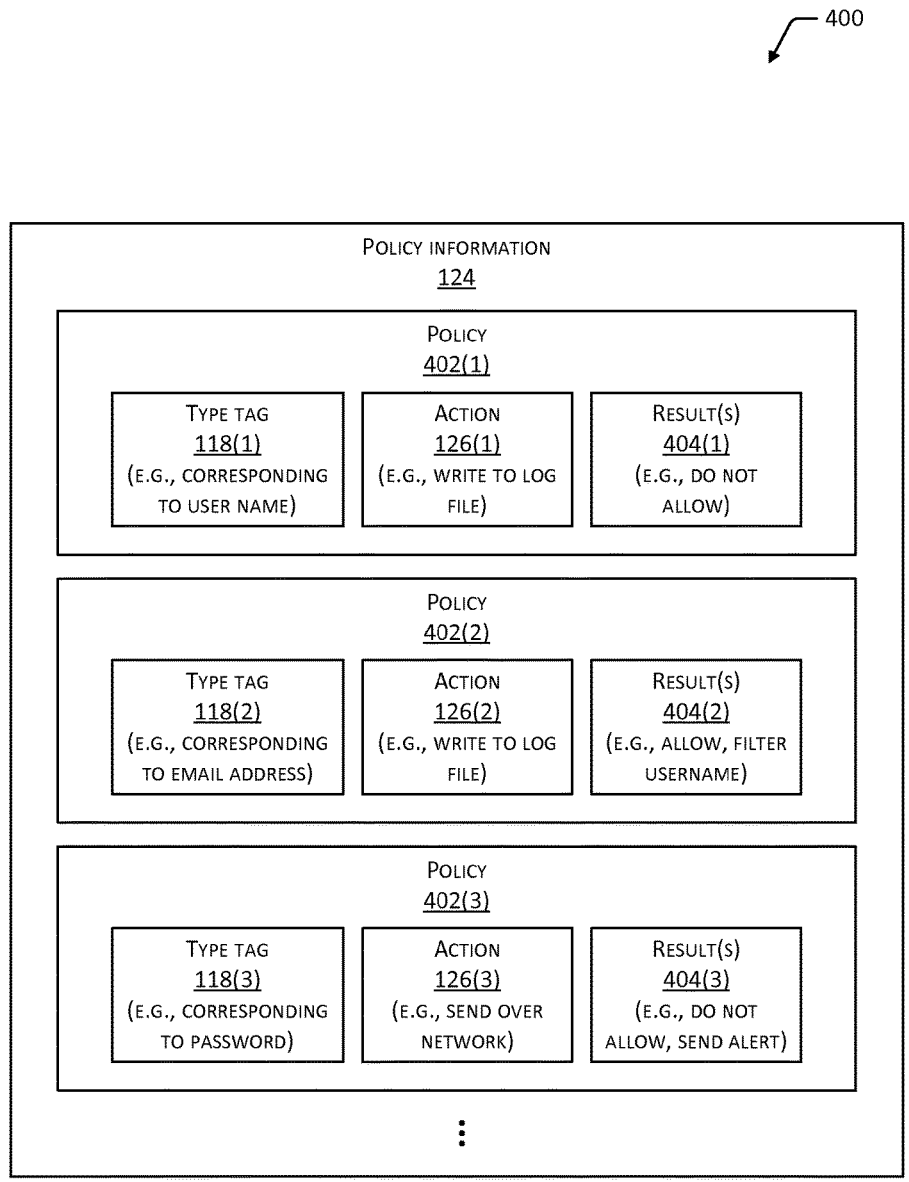
FIG. 4 depicts an example of policy information that may describe one or more policies governing data usage.

Other possible action(s) 126 are described further with reference to FIG. 4. The other computing device(s) 128 may include any type of device, including but not limited to those types of devices described with reference to the computing device(s) 102. The data storage system(s) 130 may include any number and type of datastore(s), such as relational databases and non-relational (e.g., NoSQL) datastore(s).

In some implementations, the type tag may 118 indicate a level of sensitivity or criticality of the data 120. For example, the type tag 118 may indicate that the data 120 is public, confidential, highly confidential, or critical personally identifiable information (PII). PII may include information that enables the identification, location, or communication with an individual. The policy information 124 may include policies that indicate the action(s) 126 that may be performed on data 120 of various sensitivities. For example, PII may be tagged as highly sensitive, such that actions 126 for communicating or storing such data 120 may be restricted. As another example, public information may be tagged as low sensitivity with fewer restrictions.

In some implementations, the encrypted data 106 may be sent to the decryption module 108 with an indication of the action 126 to be performed on the data 120, and the decryption module 108 may inspect the software module 104 to determine whether the indicated action 126 corresponds to the action 126 that is actually performed. In some cases, the inspection may include determining one or more libraries that are loaded by the software module 104 (e.g., active libraries) and determining whether those one or more libraries are configured to perform the indicated action 126.

Figure 2:
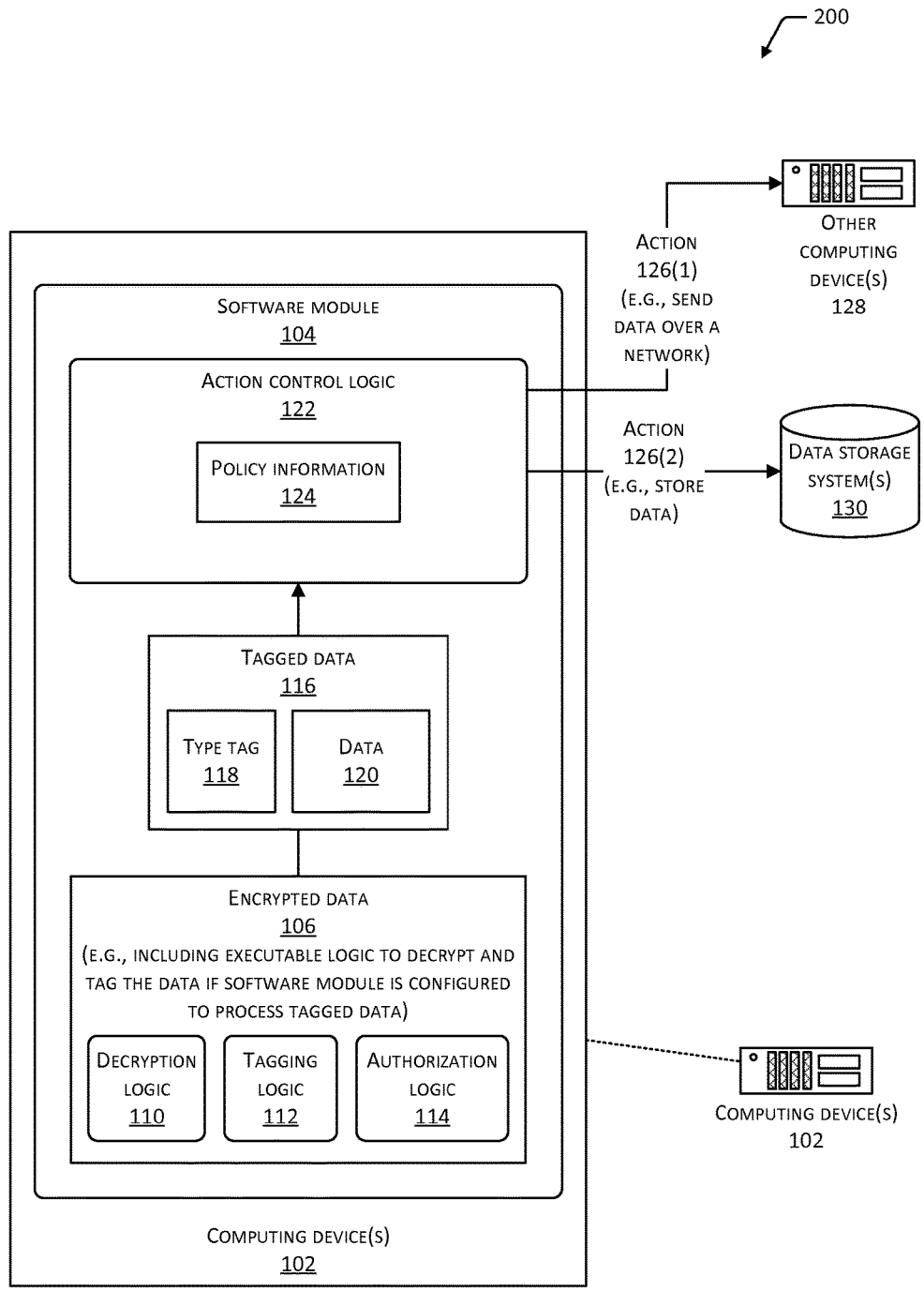
FIG. 2 depicts an environment for using tagged data to apply policies governing data usage, in which the data is tagged through operations performed by executable logic included in encrypted data.

FIG. 1 depicts an environment 100 in which the data 120 is tagged through operations performed by the decryption module 108 executing separately from the software module 104. FIG. 2 depicts an environment 200 in which the data 120 is tagged through operations performed by executable logic included in encrypted data 106. The elements depicted in FIG. 2 may be similarly configured, or perform similar operations, to like-numbered elements depicted in FIG. 1.

As shown in FIG. 2, in some implementations the encrypted data 106 may include executable logic comprising one or more of the decryption logic 110, the tagging logic 112, or the authorization logic 114. Such executable logic may comprise active information that executes when the software module 104 attempts to access and process the encrypted data 106. In some implementations, the executable logic comprises byte-codes that wrap the encrypted data 106. Such byte-codes may execute within the same JVM or other runtime execution engine as the software module 104. In some cases, the executable authorization logic 114 may compute a signature of the software module 104 and validate that the software module 104 includes the action control logic 122 for processing tagged data 116. The authorization logic 114 may also verify that the software module 104 is authorized for handling unencrypted data 120, as described above. If the software module 104 is appropriately configured and authorized, the executable decryption logic 110 may decrypt the encrypted data 106 based on computed decryption key(s) or based on key(s) received from a key broker service. In some cases, the JVM or other runtime may assert to the key broker service that it is authorized to receive the decryption key(s). The decryption logic 110 may also employ a TPM to perform cryptographic operations, as described above. Through the operations of the executable logic, the encrypted data 106 may be decrypted and tagged to generate the tagged data 116. The tagged data 116 may then be processed further by the software module 104.

In some implementations, the action(s) 126, if allowed, may be performed on the tagged data 116 as a whole. Accordingly, the type tag 118 may propagate with the data 120 as it is stored, communicated, or otherwise processed. In some implementations, the type tag 118 may be cleared or removed from the data 120 when the data 120 is subsequently re-encrypted. Accordingly, implementations may provide for the data 120 to be stored, communicated, or otherwise processed in either an encrypted state or a tagged state, to ensure that unencrypted data 120 is handled according to the data handling policies operative within an organization. Some implementations may also provide for an API or other service to enable a process to request the clearing of the type tag 118 from the data 120. In such cases, the API or other service may send a notification to one or more operators indicating that the type tag 118 has been cleared.

In cases where the data 120 is associated with a user, implementations may also ensure the privacy of the data 120 by requesting the user's permission to use the data 120. Such a request may be configured as an "opt in," in which the data 120 may not be collected, processed, or used prior to receiving explicit permission to do so from the user associated with the data 120. Alternatively, implementations may employ an "opt out" model, in which the collection, processing, and use of the data 120 are discontinued on receiving a request to do so from the user.

The various devices of the environments 100 and 200 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, the communications between the various devices in the environments 100 and 200 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

Figure 3:
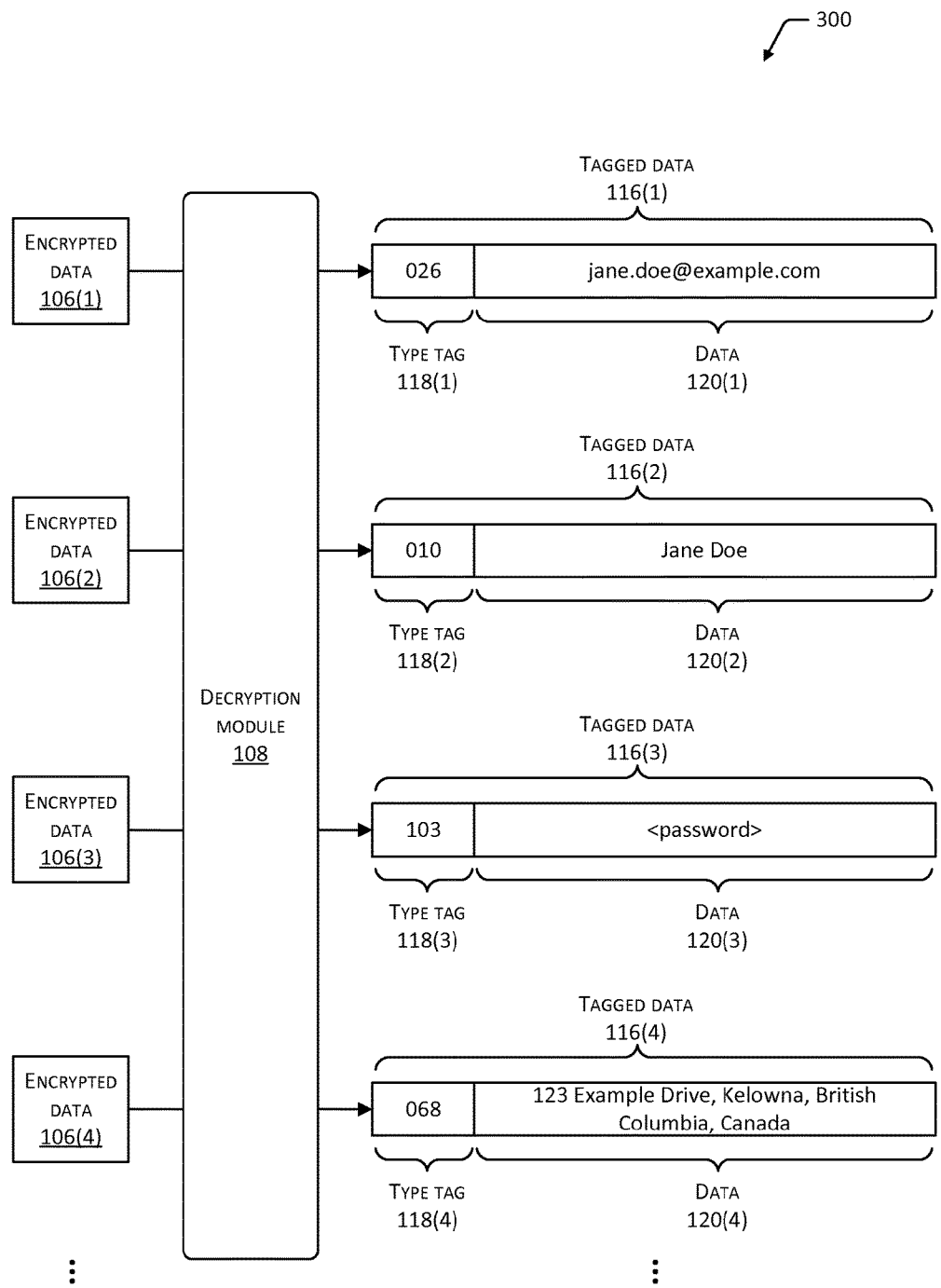
FIG. 3 depicts an example of applying a type tag to data as part of a decryption process.

FIG. 3 depicts an example 300 of applying a type tag 118 to the data 120 as part of a decryption process performed by the decryption module 108. As shown in FIG. 3, various portions of the encrypted data 106 may be processed by the decryption module 108. The tagging logic 112 that is included in, or callable from, the decryption module 108 may determine a type tag 118 that describes the data type for the data 120 generated by decrypting each portion of the encrypted data 106. In the example 300, the type tag 118 is a numeric code corresponding to a data type. For example, "026" may correspond to an email address, "010" may correspond to a user name, "103" may correspond to a password, and "068" may correspond to a home or mailing address of a user. Implementations also support the use of other formats for the type tag 118. In some cases, the type tag 118 may be a text description of the data type, such as "email", "user name", "password", or "address". The type tag 118 may be one of an enumerated list of possible type tags 118 that each map to or otherwise correspond with a data type. The type tag 118 may also comprise information (e.g., free form text) that is not in a list of possible type tags 118.

Implementations support the use of a type tag 118 that describes the data type of the data 120 to any degree of specificity. For example, an email address may be assigned a different type tag 118 depending on whether the email address is external (e.g., for a customer, supplier, vendor, end-user, etc.) or internal (e.g., for an employee) to an organization. In some cases, the type tag 118 may indicate a quantity of items described by the data 120.

In some implementations, the type tag 118 may be incorporated into a portion of the data 120. For example, the data 120 may be altered to include the type tag 118 in a predetermined number of bits at the beginning or end of the data 120, or at another predetermined position within the data 120. Alternatively, the type tag 118 and the data 120 may be included in a data structure that is propagated by processes that handle the data 120. Implementations may prevent the clearing of the type tag 118 from the data 120 except by authorized individuals or processes, to ensure the consistent application of data usage policies.

In some cases, tagged data 116(2) may include multiple type tags 118. For example, if the data 120 is an address (e.g., home address) of an individual, the tagged data 116 may include multiple type tags 118 indicating, respectively, a zip code, a street address, sensitive user data, and so forth.

FIG. 4 depicts an example 400 of the policy information 124 that may describe one or more policies 402 governing data usage. As shown in FIG. 4, each policy 402 may include a type tag 118, a possible action 126, and one or more results 404 determined by the policy 402. A policy 402 may dictate the result(s) 404 to be performed by the action control logic 122 when the software module 104 attempts the action 126 on data 120 associated with the type tag 118.

For example, as shown in FIG. 4, a policy 402(1) may indicate that the software module 104 is to be prevented from writing data 120 to a log file if the data 120 includes a user name. A policy 402(2) may allow the software module 104 to write an email address to a log file if the email address is filtered to remove or obfuscate the username portion of the email address, such that the domain portion of the email address is written to the log file. A policy 402(3) may prevent the software module 104 from sending a password over a network. The result(s) 404(3) of such an attempted action 126(3) may include sending an alert to notify operator(s) or other individual(s) of the attempted action 126(3).

The action(s) 126 may be performed by the instructions of the software module 104. The action(s) 126 may also be performed by other modules, such as libraries, APIs, and so forth, in response to calls or requests from the software module 104. The action(s) 126 may include, but are not limited to, one or more of the following:

Sending the data 120 over a network to other computing device(s) 128;

Calling a particular service, API, or device, such as using a Representational State Transfer-based (e.g., RESTful) API to call a particular service;

Passing the data 120 a local service executing on the computing device(s) 102, or to a remote service executing on the other computing device(s) 128;

Performing a network call that lacks adequate security, such as attempting to communicate the data 120 over a network connection that is unsecured via TLS or another security protocol;

Sending the data 120 to a calling process that is unauthenticated;

Sending the data 120 to an individual that is unauthenticated or unauthorized;

Storing the data 120 in a datastore, or writing the data 120 to a file;

Encrypting (e.g., re-encrypting) the data 120; or

Removing or otherwise disassociating the type tag(s) 118 from the data 120.

In some cases the action control logic 122 may access one or more whitelists or blacklists to validate the attempted action(s) 126. A whitelist may describe one or more processes, devices, or individuals authorized to access the data 120. A blacklist may describe one or more processes, devices, or individuals unauthorized to access the data 120.

The result(s) 404 may include, but are not limited to, one or more of the following:

Allow the action 126;

Allow the action 126, and send a notification (e.g., an alert) describing the action 126;

Allow the action 126 and write a description of the action 126 to a log file;

Prevent the attempted action 126;

Prevent the attempted action 126, and send a notification (e.g., an alert, error, exception, assertion, etc.) describing the attempted action 126;

Prevent the attempted action 126 and write a description of the attempted action 126 to a log file; or Prevent the attempted action 126, and suspend or terminate execution of the software module 104 that attempted the action 126.

The result(s) 404 may also include allowing the action 126, but modifying the data 120 to filter, remove, obfuscate, or otherwise alter a portion of the data 120. For example, the domain portion but not the username portion of an email address may be written to a file, stored in a datastore, communicated over a network, or otherwise handled. As another example, a credit card number may be written, stored, communicated, or otherwise handled in a modified form such that the last four digits of the credit card number are visible but the remainder of the credit card number is obfuscated. In some cases, a user name may be written, stored, communicated, or otherwise handled, but with the family name filtered out.

In some cases, a policy 402 may describe a device or software module that is a target of the action 126, and the policy 402 may describe the result(s) 404 of attempting the particular action 126 with respect to the target. For example, for a particular type tag 118, policies 402 may indicate that communicating the data 120 to device A may be allowed, but communicating the data 120 to device B may not be allowed. As another example, for a particular type tag 118, policies 402 may indicate that storing the data 120 is allowed in both datastore X and datastore Y, but an alert is generated when the data 120 is stored in datastore Y.

Figure 5:
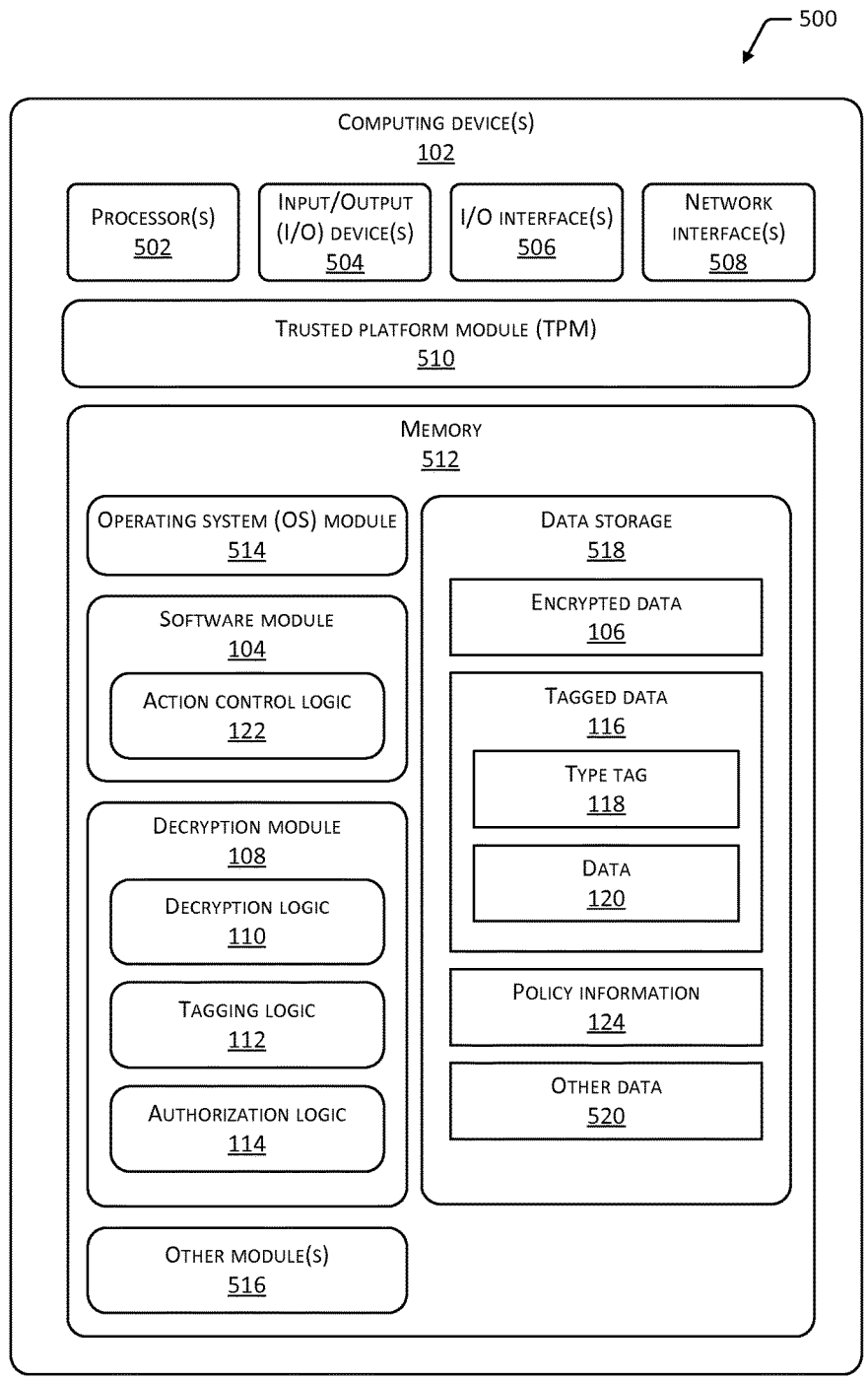
FIG. 5 depicts a block diagram of an example of computing device(s) configured to perform operations to tag data and apply data usage policies to the tagged data, in which the data is tagged through operations performed by a decryption module.

FIG. 5 depicts a block diagram 500 of an example of the computing device(s) 102. As shown in the block diagram 500, the computing device(s) 102 may include one or more processors 502 configured to execute one or more instructions. The processor(s) 502 may include hardware-based processor(s) 502, and may comprise one or more cores.

The computing device(s) 102 may include one or more input/output (I/O) devices 504. The I/O device(s) 504 may include one or more input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 504 may also include one or more output devices such as a display, an audio output device (e.g., a speaker), a printer, a haptic output device, and so forth. The I/O device(s) 504 may be physically incorporated with the computing device(s) 102 or may be externally placed.

The computing device(s) 102 may include one or more I/O interfaces 506 to enable components or modules of the computing device(s) 102 to control, interface with, or otherwise communicate with the I/O device(s) 504. The I/O interface(s) 506 may enable information to be transferred in or out of the computing device(s) 102, or between components of the computing device(s) 102, through serial communication, parallel communication, or other types of communication. For example, the I/O interface(s) 506 may comply with a version of the RS-232 standard for serial ports, or with a version of the Institute of Electrical and Electronics Engineers (IEEE) 1284 standard for parallel ports. As another example, the I/O interface(s) 506 may be configured to provide a connection over Universal Serial Bus (USB) or Ethernet. In some cases, the I/O interface(s) 506 may be configured to provide a serial connection that is compliant with a version of the IEEE 1394 standard. The computing device(s) 102 may also include one or more busses or other internal communications hardware or software that enables the transfer of data between the various modules and components of the computing device(s) 102.

The computing device(s) 102 may include one or more network interfaces 508 that enable communications between the computing device(s) 102 and other network accessible devices. The network interface(s) 508 may include one or more network interface controllers (NICs) or other types of transceiver devices configured to send and receive communications over one or more networks. The computing device(s) 102 may also include a TPM 510 as described above.

The computing device(s) 102 may include one or more memories, described herein as memory 512. The memory 512 comprises one or more computer-readable storage media (CRSM). The CRSM may include one or more of an electronic storage medium, a magnetic storage medium, an optical storage medium, a quantum storage medium, a mechanical computer storage medium, and so forth. The memory 512 provides storage of computer-readable instructions describing data structures, program modules, processes, applications, or other data for the operation of the computing device(s) 102. In some implementations, the memory 512 may provide storage of computer-readable instructions or other information in a non-transitory format.

The memory 512 may include an OS module 514. The OS module 514 may be configured to manage hardware resources such as the I/O device(s) 504, the I/O interface(s) 506, the network interface(s) 508, and the TPM 510. The OS module 514 may also be configured to provide various services to applications, processes, or modules executed by the processor(s) 502. The OS module 514 may include one or more of the following: any version of the Linux™ OS; any version of iOS™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The memory 512 may include one or more of the modules described above as executing on the computing device(s) 102, such as one or more of the software module 104 or the decryption module 108. The action control logic 122 may be incorporated into the software module 104, or may execute in a separate module. One or more of the decryption logic 110, the tagging logic 112, or the authorization logic 114 may be incorporated into the decryption module 108, or may execute in separate module(s). In cases where the software module 104 is a web application, the memory 512 may also include a web browser to execute the web application. The memory 512 may also include one or more other modules 516, such as a user authentication module or an access control module to secure access to the computing device(s) 102, a cryptographic module to secure communications to and from the computing device(s) 102, and so forth.

The memory 512 may include, or have access to, data storage 518 which stores data for operations of the computing device(s) 102. The data storage 518 may comprise a file system, database, array, structured list, tree, or other data structure, and may be a relational or a non-relational datastore. The data storage 518 may store any of the information described above as being present on the computing device(s) 102, such as one or more of the encrypted data 106, the tagged data 116, the type tag 118, the data 120, or the policy information 124. The data storage 518 may also store other data 520 such as user authentication information, access control data, cryptographic information, or other information. In some implementations, at least a portion of the information stored in the data storage 518 may be stored externally to the computing device(s) 102, on other devices that may communicate with the computing device(s) 102 via the I/O interface(s) 506 or the network interface(s) 508.

Figure 6:
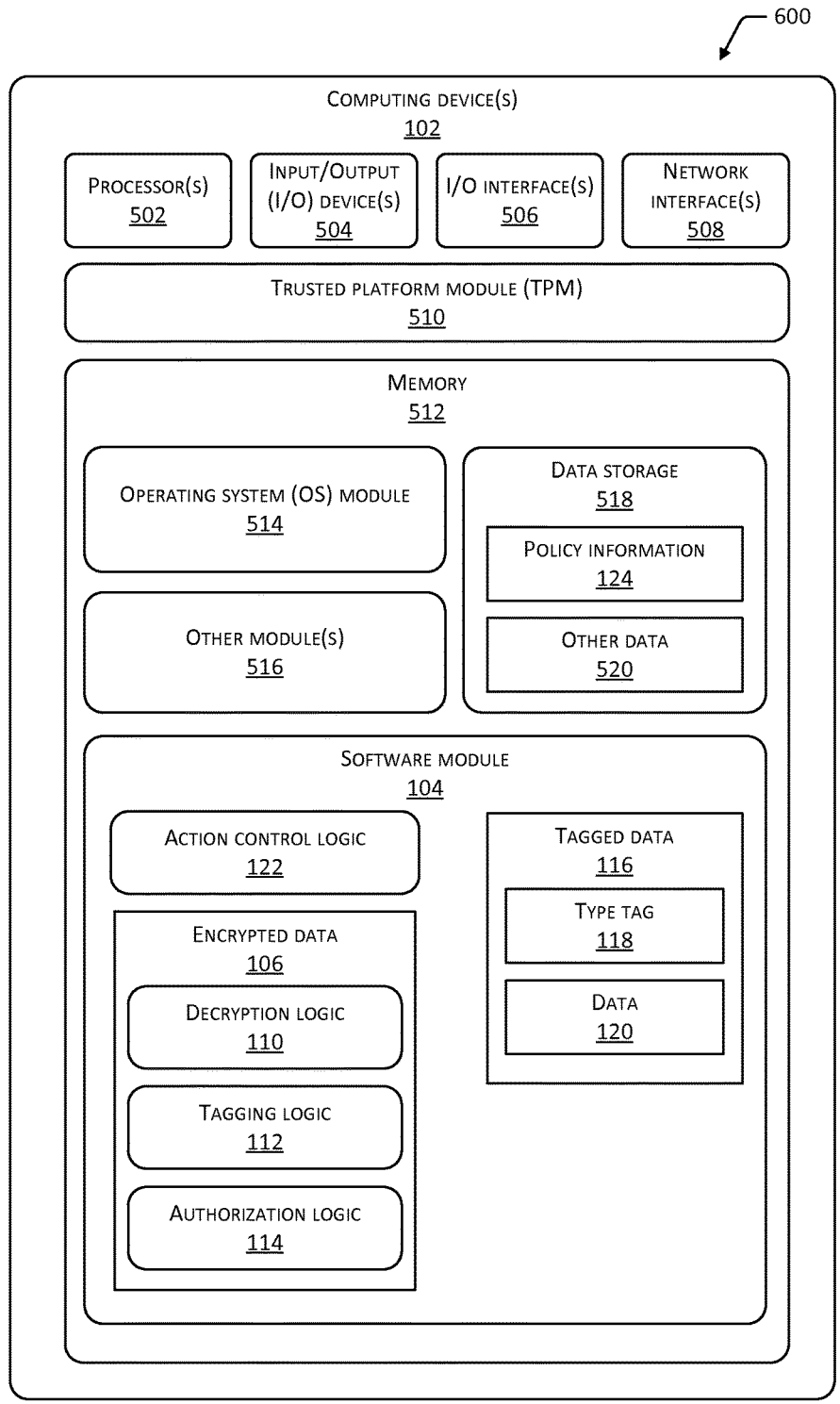
FIG. 6 depicts a block diagram of an example of computing device(s) configured to perform operations to tag data and apply data usage policies to the tagged data, in which the data is tagged through operations performed by executable logic included in encrypted data.

FIG. 5 depicts an example of the computing device(s) 102 in which the data 120 is tagged through operations performed by the decryption module 108 executing separately from the software module 104, as described with reference to FIG. 1. FIG. 6 depicts a block diagram 600 of an example of the computing device(s) 102 in which the data 120 is tagged through operations performed by executable logic included in encrypted data 106, as described with reference to FIG. 2. The elements depicted in FIG. 6 may be similarly configured, or perform similar operations, to like-numbered elements depicted in FIG. 5.

In the example of FIG. 6, the encrypted data 106 includes executable instructions (e.g., active data) comprising one or more of the decryption logic 110, the tagging logic 112, or the authorization logic 114. In some cases, the executable instructions may be byte-codes that are executed within a JVM or other runtime when the software module 104 accesses the encrypted data 106. As described above, the executable instructions may decrypt the encrypted data 106 to generate the data 120, analyze the data 120 to determine the type tag 118, and generate the tagged data 116 including the data 120 and the type tag 118. In some implementations, the tagged data 116 may be in the active runtime memory of the software module 104. Alternatively, the tagged data 116 may be stored in the data storage 518 (e.g., persistent memory). In some cases, before decrypting the encrypted data 106 the authorization logic 114 included in the executable instructions may perform operations to determine whether the software module 104 is authorized to access the unencrypted data 120 and configured to process the tagged data 116.

Figure 7:
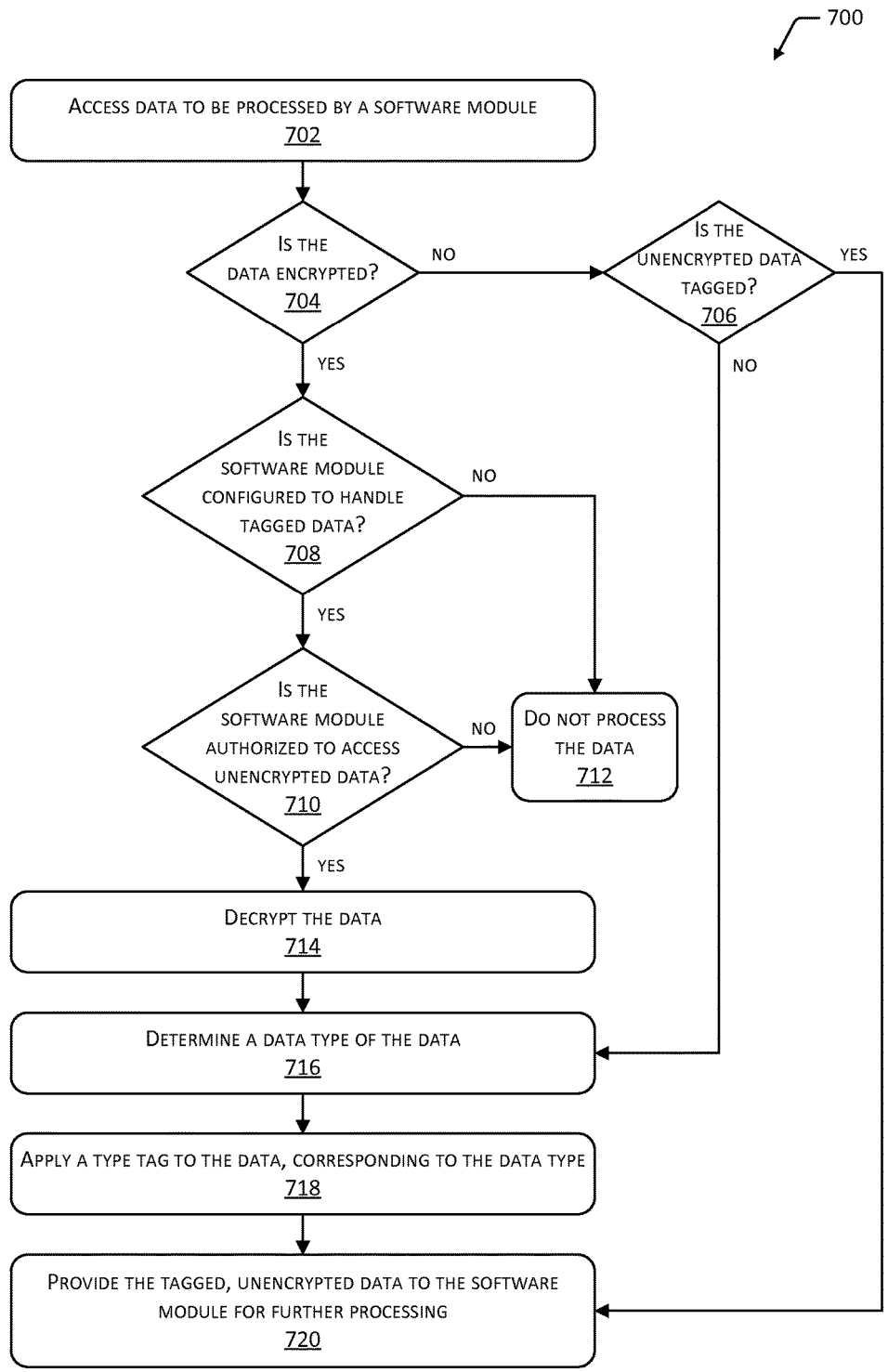
FIG. 7 depicts a flow diagram of a process for decrypting encrypted data and applying a type tag describing a data type of the data.

FIG. 7 depicts a flow diagram 700 of a process for decrypting the encrypted data 106 and determining a type tag 118 describing a data type of the unencrypted data 120. Operations of the process may be performed by one or more of the software module 104, the action control logic 122, the decryption module 108, the decryption logic 110, the tagging logic 112, the authorization logic 114, the other module(s) 516 executing on the computing device(s) 102, or other modules executing on other device(s).

At 702, data may be received or otherwise accessed. In some cases, the data may be provided by a software module 104 that is configured to process the data and perform one or more actions 126 on the data. The received or accessed data may be encrypted or unencrypted.

At 704, a determination is made whether the data is encrypted. If so, the process may proceed to 708. If the data is unencrypted, the process may proceed to 706.

At 706, a determination is made whether the unencrypted data is tagged (e.g., associated with a type tag 118). If so, the process may proceed to 720. If the unencrypted data is not associated with a type tag 118, the process may proceed to 716. In some implementations, system(s) within an execution environment may not be allowed to process data that is both unencrypted and untagged. In such cases, if the unencrypted data is not associated with a type tag 118, the process may proceed to 712.

At 708, a determination is made whether the software module 104 is configured to handle or otherwise process tagged data 116. As described above, such a determination may be made based on whether the software module 104 includes, or has access to, the action control logic 122. If the software module 104 is not configured to handle tagged data 116, the process may proceed to 712. If the software module 104 is configured to handle tagged data 116, the process may proceed to 710.

At 710, a determination is made whether the software module 104 is authorized to access unencrypted data. Such a determination may be performed by the authorization logic 114 as described above. If the software module 104 is not authorized, the process may proceed to 712. If the software module 104 is authorized, the process may proceed to 714.

At 712, in some implementations no further processing may be performed on the data. In some cases at 712, a notification such as an error, exception, assertion, or other type of notification may be issued. In cases where 712 is reached because the execution environment does not allow the handling of unencrypted, untagged data, the notification may indicate that the execution environment does not allow the handling of data that is both unencrypted and untagged. In cases where 712 is reached because the software module 104 is not configured to handle tagged data 116, the notification may indicate that the software module 104 is not configured to handle tagged data 116. In cases where 712 is reached because the software module 104 is not authorized to access unencrypted data, the notification may indicate that the software module 104 is not authorized to access unencrypted data.

At 714, at least a portion of the encrypted data 106 may be decrypted by the decryption logic 110 to generate the unencrypted data 120.

At 716, the tagging logic 112 may determine a data type of the data 120. This determination is described further with reference to FIG. 9.

At 718, the tagging logic 112 may determine a type tag 118 corresponding to the data type of the data 120. The type tag 118 may be applied to the data 120 to generate the tagged data 116.

At 720, processing of the tagged data 116 may continue. As described above, in some implementations tagged data 116 may be provided to the software module 104 for further processing. The tagged data 116 may include the type tag 118 and the unencrypted data 120.

Figure 8:
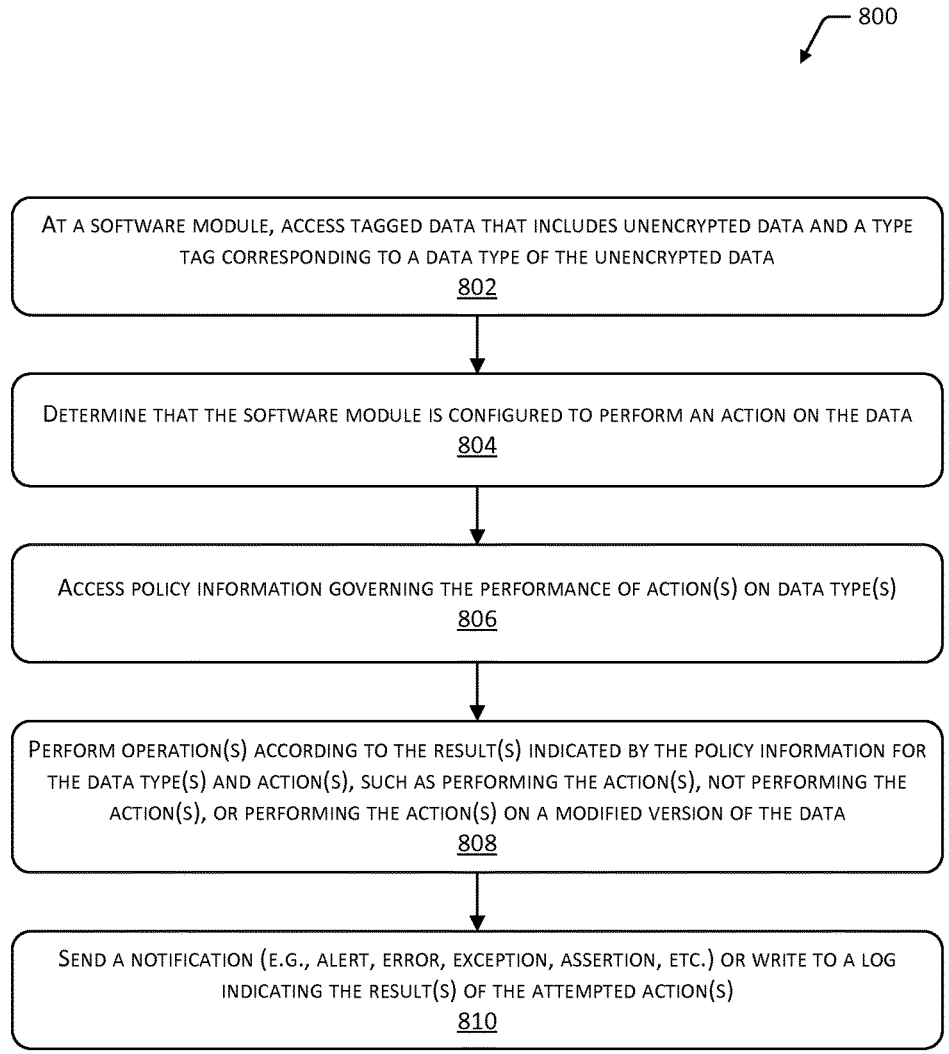
FIG. 8 depicts a flow diagram of a process for employing the type tag to apply policies governing the use of the tagged data.

FIG. 8 depicts a flow diagram 800 of a process for employing the type tag 118 to apply policies 402 governing the use of the data 120. Operations of the process may be performed by one or more of the software module 104, the action control logic 122, the decryption module 108, the decryption logic 110, the tagging logic 112, the authorization logic 114, the other module(s) 516 executing on the computing device(s) 102, or other modules executing on other device(s).

At 802, a software module 104 may access tagged data 116 that includes unencrypted data 120 and a type tag 118. As described above, the type tag 118 may correspond to a data type of the data 120.

At 804, a determination may be made that the software module 104 is configured to perform an action 126 on the data 120 or to call another module to perform the action 126. For example, the software module 104 may include one or more instructions describing a method call to perform the action 126 or request that another module perform the action 126. The action control logic 122 may trap, intercept, or otherwise detect the instruction(s) that perform the action 126

At 806, the action control logic 122 may access the policy information 124 governing the performance of action(s) 126 on data type(s).

At 808, the action control logic 122 may perform one or more operations corresponding to the result(s) 404 of a policy 402 for the type tag 118 and the action(s) 126. As described above, such result(s) 404 may include allowing the action(s) 126, preventing the action(s) 126, allowing the action(s) 126 to proceed on a modified version of the data 120, and so forth. In cases where the policy 402 indicates that the action(s) 126 are to be performed on a modified version of the data 120, the modified version of the data 120 may be determined by applying one or more modifications described in the policy information 124.

At 810, in some cases the policy information 124 may indicate that a notification is to be sent when the action(s) 126 are attempted on data 120 with the type tag 118. Such a notification may comprise an error, exception, alert, assertion, or other type of message. The notification may be sent to one or more operators, engineers, managers, or other individuals associated with the software module 104 or the computing device(s) 102. A notification may be sent when the action(s) 126 are prevented. In some cases, a notification may be sent when the action(s) 126 are allowed. In some cases, the policy information 124 may also indicate that a log file is to be written to include information regarding the result(s) 404 of the attempted action(s) 126.

Figure 9:
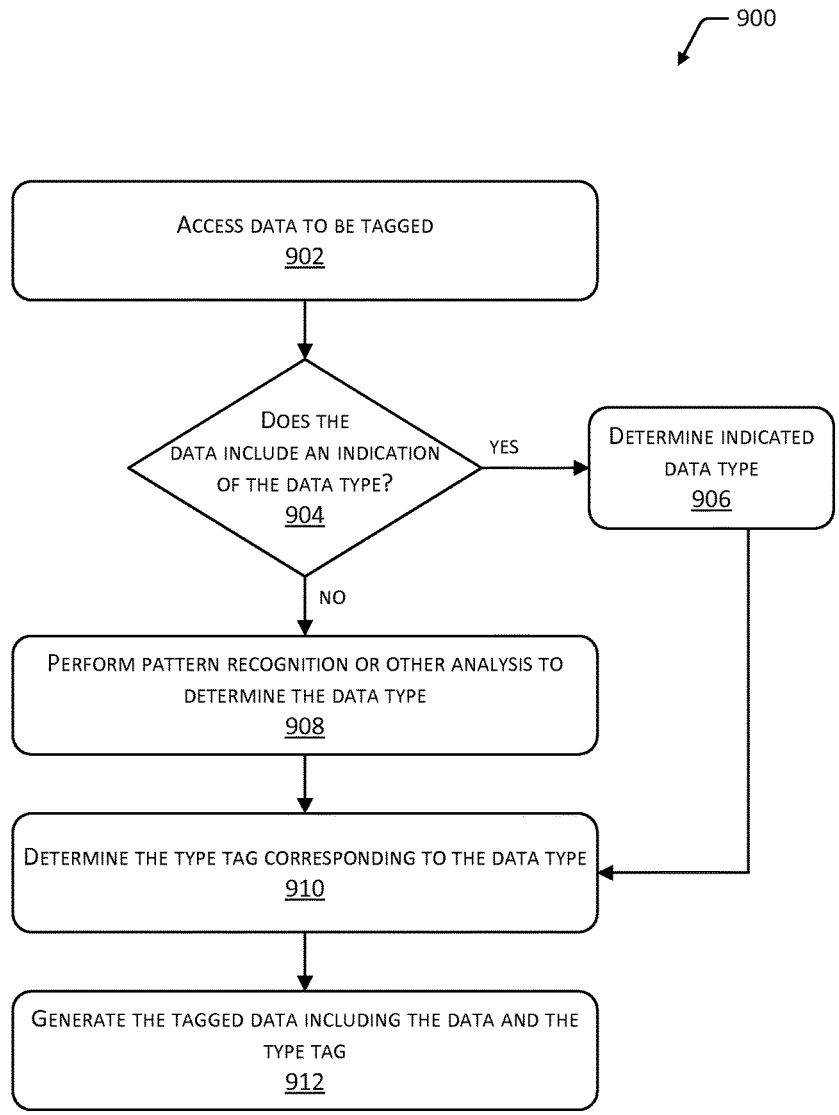
FIG. 9 depicts a flow diagram of a process for determining a type tag describing a data type of data.

FIG. 9 depicts a flow diagram 900 of a process for determining a type tag 118 describing a data type of the data 120. Operations of the process may be performed by one or more of the software module 104, the action control logic 122, the decryption module 108, the decryption logic 110, the tagging logic 112, the authorization logic 114, the other module(s) 516 executing on the computing device(s) 102, or other modules executing on other device(s).

At 902, the process may access data 120 to be tagged. In some cases, the data 120 may be generated by decrypting the encrypted data 106. At 904, a determination is made whether the data 120 includes, or was provided along with, an indication of its data type. In some cases, the indication of the data type may be explicitly provided by an individual or process that generated or sent the data 120 or the encrypted data 106. The indication of the data type may also be implicit. For example, if the data 120 originated from, or is received from, a service that manages and provides security credentials (e.g., passwords, certificates, tokens, etc.), an inference may be made that the data 120 is a security credential. If it is determined at 904 that the data 120 includes or is provided with an indication of its data type, the process may proceed to 906. At 906, the indicated data type is determined and the process may proceed to 910.

If it is determined at 904 that the data 120 does not include an indication of the data type, the process may proceed to 908. At 908, the data 120 may be analyzed to determine a data type. In some cases, the analysis may include pattern recognition to identify patterns corresponding to particular data types. For example, the analysis may search for a pattern "*@*.*" to recognize that the data 120 includes an email address. An email address may be internal to the organization that manages the computing device(s) 102, such as where the email address is that of an employee, manager, owner, and so forth. An email address may be external to the organization, such as where the email address is that of an end user, customer, vendor, and so forth. The analysis to determine the data type may also include searching for 16 digit numbers, or apply a mod 10 (e.g., Luhn) algorithm, to determine that the data 120 includes a credit card number or other payment instrument information. In some cases, the pattern recognition may employ a positive analysis to determine that the data 120 fits a known pattern. Alternatively, the pattern recognition may employ a negative analysis to determine that the data 120 does not fit a known pattern. The determination of the data type may also be performed, at least in part, manually.

At 910, the type tag 118 corresponding to the data type is determined. At 912, the tagged data 116 is generated to include the type tag 118 and the data 120. In some cases, the determination of the type tag 118 may be made via a lookup table that maps data types to codes (e.g., numeric codes).

Although examples herein describe applying the type tag 118 to the data 120 as part of a decryption process, implementations are not so limited. In some implementations, the tagging logic 112 may analyze unencrypted data 120 to determine its data type and apply the type tag 118 independently of a decryption process.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art.

It is intended that the present disclosure encompass such changes and modifications that fall within the scope of the appended claims.

What is claimed is:

1. A computer-implemented method, comprising:
receiving encrypted data at a decryption module employing a trusted platform module (TPM) executed by a computing device providing a secure environment for performing cryptographic operations to provide unencrypted data to a software module;
determining the software module is configured to process tagged data using policy information;
processing the encrypted data by the decryption module, including:
  decrypting the encrypted data to generate the unencrypted data;
  analyzing the unencrypted data to determine its data type; and
  generating the tagged data that includes the unencrypted data and a type tag including metadata that propagates with the unencrypted data to identify the data type of the unencrypted data;
determining, by the decryption module based on the data type described by the metadata of the type tag, that the software module is configured to perform an action on the unencrypted data, the action including one or more of:
  storing the unencrypted data in a datastore;
  communicating the unencrypted data over a network; or
  writing the unencrypted data to a file;
propagating the tagged data including the unencrypted data and the type tag to the software module;
accessing, by the software module, the policy information associated with the type tag of the unencrypted data to enforce data usage policies governing performance of the action on the data type;
determining by the software module, from the policy information associated with the data type, the action to be attempted;
examining, by the software module, the policy information associated with the data type to determine a result including one or more of:
  preventing the action from being performed by the software module, according to the policy information indicating that the action is disallowed for the data type; or
  performing the action on the tagged data by the software module, according to the policy information indicating that the action is allowed for the data type; and
executing, by the software module, the result associated with the data type identified by the policy information.

2. The method of claim 1, the processing of the encrypted data being performed by the decryption module executing separately from the software module.

3. The method of claim 1, the processing of the encrypted data being performed by executable logic included in the encrypted data.

4. The method of claim 1, the processing of the encrypted data further comprising:
determining that the software module is authorized to access the unencrypted data;
determining that the software module is configured to process the tagged data; and
providing the tagged data to the software module, responsive to determining that the software module is authorized to access the unencrypted data and configured to process the tagged data.

5. The method of claim 1, wherein:
the policy information indicates that the action is disallowed for the data type;
the result further comprises generating a notification indicating that the action is disallowed; and
the notification includes one or more of an alert, an error, an assertion, or an exception.

6. A system, comprising:
at least one computing device comprising:
memory storing computer-executable instructions; and
a processor, coupled to the memory, the processor executing the computer-executable instructions for implementing one or more modules including a decryption module and a software module, the processor operating to:
  receive encrypted data at the decryption module for performing cryptographic operations in a secure environment to provide unencrypted data to the software module;
  decrypt, by the decryption module, the encrypted data to generate tagged data including the unencrypted data and a data type, including metadata that describes the data type of the unencrypted data, that propagates with the unencrypted data to identify the data type of the unencrypted data;
  propagate the tagged data including the unencrypted data and a type tag to the software module;
  store the propagated tagged data in data storage for access by the software module;
  determine the software module is configured to process the tagged data using policy information;
  access, the tagged data from the data storage by the software module, the tagged data including the unencrypted data and the type tag including the metadata that describes the data type of the unencrypted data;
  determine, by the software module based on the data type described by the metadata of the type tag, an action to be performed by the software module on the unencrypted data, the action including one or more of:
    storing the unencrypted data in a datastore;
    communicating the unencrypted data over a network; or
    writing the unencrypted data to a file;
  access, by the software module, the policy information associated with the type tag of the unencrypted data to enforce data usage policies governing performance of the action on the data type;
  examine, by the software module, the policy information associated with the data type to determine a result; and
  based on the result, prevent the action from being performed by the software module, according to the policy information indicating that the action is disallowed for the data type.

7. The system of claim 6, wherein the action comprises one or more of:
encrypting the unencrypted data; or
disassociating the type tag from the unencrypted data.

8. The system of claim 6, wherein the data type comprises one or more of:
a user identifier;
a user description;

a user address;
sensitive user information;
user behavior information;
a security credential; or
payment instrument information.

9. The system of claim 6, wherein the decryption module executes on the software module to execute decryption instructions to:
   access the policy information using the tagged data that includes the unencrypted data and the type tag corresponding to the data type of the unencrypted data; and
   identify a policy associated with the type tag from the policy information.

10. The system of claim 9, wherein the decryption module further operates to:
    determine that one or more of the software module or the at least one computing device is authorized to process the unencrypted data; and
    provide the tagged data to the software module, responsive to determining that the one or more of the software module or the at least one computing device is authorized to process the unencrypted data.

11. The system of claim 6, wherein:
    the software module is further configured to access the encrypted data that includes executable logic which operates to:
    determine the data type of the unencrypted data; and
    access the policy information using the tagged data that includes the unencrypted data and the type tag corresponding to the data type of the unencrypted data to identify a policy associated with the type tag from the policy information.

12. The system of claim 11, wherein the executable logic further operates to:
    determine that one or more of the software module or the at least one computing device is authorized to process the unencrypted data; and
    generate the tagged data, responsive to determining that the one or more of the software module or the at least one computing device is authorized to process the unencrypted data.

13. The system of claim 6, wherein the software module is further configured to:
    cause the action to be performed on the tagged data, according to the policy information indicating that the action is allowed for the data type.

14. The system of claim 6, wherein the software module is further configured to:
    generate a notification indicating that the action is disallowed, the notification including one or more of an alert, an error, or an exception.

15. One or more non-transitory computer-readable storage media storing instructions that are callable from a software module, the instructions being executable to instruct at least one computing device to perform operations comprising:
    accessing encrypted data for performing cryptographic operations in a secure environment;
    decrypting the encrypted data to generate unencrypted data;
    analyzing the unencrypted data to determine its data type;
    generating tagged data that includes the unencrypted data and a type tag including metadata that propagates with the unencrypted data to identify the data type of the unencrypted data;
    determining the software module is configured to process the tagged data;
    determining that the software module is configured to perform a first action on the unencrypted data, the first action including one or more of:
        storing the unencrypted data in a datastore;
        communicating the unencrypted data over a network; or
        writing the unencrypted data to a file;
    propagating the tagged data including the unencrypted data and the type tag to the software module;
    accessing the tagged data that includes the unencrypted data and the type tag including the metadata that describes the data type of the unencrypted data;
    using the data type described by the metadata of the type tag to access policy information that governs performance of the first action on the data type; and
    determining, according to the policy information, a second action to be performed on the unencrypted data by the software module, the second action comprising:
        preventing the first action, responsive to the policy information indicating that the first action is disallowed for the data type;
        performing the first action on the unencrypted data, responsive to the policy information indicating that the first action is allowed for the data type; or
        performing the first action on a modified version of the unencrypted data.

16. The one or more non-transitory computer-readable storage media of claim 15, wherein performing the first action on the modified version of the unencrypted data further comprises:
    determining the modified version of the unencrypted data according to a modification described in the policy information.

17. The one or more non-transitory computer-readable storage media of claim 15, wherein the first action further comprises one or more of:
    encrypting the unencrypted data; or
    disassociating the type tag from the unencrypted data.

18. The one or more non-transitory computer-readable storage media of claim 15, wherein the data type comprises one or more of:
    a user identifier;
    a user description;
    a user address;
    sensitive user information;
    user behavior information;
    a security credential; or
    payment instrument information.

19. The one or more non-transitory computer-readable storage media of claim 15, wherein:
    the data type indicates that the unencrypted data includes one or more of a security credential or payment instrument information;
    the first action comprises communicating the unencrypted data over the network; and
    the second action comprises preventing the first action.

20. The one or more non-transitory computer-readable storage media of claim 15, wherein:
    the data type indicates that the unencrypted data includes one or more of a user address or payment instrument information;
    the first action comprises writing the unencrypted data to one or more of the datastore or the file; and
    the second action comprises writing a modified version of the unencrypted data, the modified version being one or more of a redacted version of the unencrypted data or an obfuscated version of the unencrypted data.

* * * * *